United States Patent [19]

Clark

[11] 4,376,331

[45] Mar. 15, 1983

[54] VALVE SPRING COMPRESSOR

[75] Inventor: James T. Clark, Fort Morgan, Colo.

[73] Assignee: Parker-Hannifin Corporation, Cleveland, Ohio

[21] Appl. No.: 205,352

[22] Filed: Nov. 10, 1980

[51] Int. Cl.[3] .......... B23P 19/04

[52] U.S. Cl. .......... 29/219; 269/249; 269/283

[58] Field of Search .......... 81/421, 422, 423, 177 A; 29/215, 217, 218, 219, 220, 221; 269/283, 249

[56] References Cited

U.S. PATENT DOCUMENTS

| | | | |
|---|---|---|---|
| 440,435 | 11/1890 | O'Neill et al. | 81/177 A |
| 1,256,216 | 2/1918 | Fessler | 81/177 A |
| 1,785,436 | 12/1930 | Carlson | 81/3.42 |
| 1,871,498 | 8/1932 | Clark | 29/219 |
| 1,879,330 | 9/1932 | Kulp et al. | 29/221 |
| 3,657,944 | 4/1972 | Able | 81/177 A |

*Primary Examiner*—James L. Jones, Jr.
*Attorney, Agent, or Firm*—Joseph B. Balazs

[57] ABSTRACT

A valve spring compressor tool having a quick-change arrangement for replacement of jaws thereon. The compressor tool is a generally c-shaped structure having lower legs adapted to receive a set of jaws for engaging an automotive rocker spring or the like. The jaws comprise inwardly facing channel sections adapted to slide over the free ends of the frame legs and to be secured in place by releasable clamp members, secured by attachment screws. The jaws include a threaded spacer screw for changing the spacing to a accommodate various sizes of washers, valve seats, springs and the like.

4 Claims, 4 Drawing Figures

VALVE SPRING COMPRESSOR

BACKGROUND OF THE INVENTION

Valve spring compressors are well known and are essential devices for the removal of the relatively stiff rocker springs and the like in conventional automotive engines. Such a tool must be extremely sturdy to withstand repeated usage and yet be convenient for handling by the mechanic. Typically the tool is inserted in place over the valve spring and an initial adjustment performed in order to match the general spacing of the abutment means of the tool to the valve spring and associated components of the vehicle, and then the tool is actuated to compress the spring so that removal or replacement may be performed.

Another adjustment that is required of such tools is that the jaws be varied in spacing to accommodate different valve spring sizes or in fact be readily replaceable to accommodate different size ranges. Such separable jaw and frame structures are well established in the art being shown for example in U.S. Pat. Nos. Re. 19,414, 3,038,247, 3,039,180 and 3,668,765. In these prior art devices the valve engaging jaws are typically secured to the frame by means of threaded fasteners and in order to replace the set of jaws on the tool it is necessary to fully withdraw the fasteners so that a new set of jaws may be positioned thereon. It is also typical of such prior art devices that the adjustment member for setting the spacing of the individual jaw segments need be removed as well as typically it is positioned intermediate the other fastening devices. Such interchange therefore typically required the removal of four or five screws or bolts, thereby freeing the jaws completely and requiring that the new set of jaws be held temporarily in place by hand while the fasteners were rethreaded into position, this being a relatively inconvenient procedure requiring the starting of each of the threaded members and the prealignment of the component members of the jaw set.

Further, in such arrangement it was common that one or more of the threaded members might be lost and that the tool might be used in such incomplete state, and which under the relatively high spring forces encountered, resulted in a relatively unsafe structure.

SUMMARY OF THE INVENTION

The apparatus of this invention provides a convenient means for interchange of the jaws of a valve compressor tool or the like in a relatively straightforward manner and providing a secure, reliable interengagement between the jaws and the frame of the tool to provide a reliable and safe structure therefore. Such arrangement is provided in that the valve engaging jaws are formed of channeled structures which may be slid linearly relative to the free ends of the compressor tool frame and then be gripped by a quick-release clamping device to secure the jaws into position.

The channel configuration of the jaws prevents transverse movement of the jaws relative to the frame, while the clamping means prevents linear movement with respect thereto once the jaws have been secured into position.

It is a further advantage of this invention that the jaw width adjustment member is located forwardly of the free ends of the frame so as to be moved together with the jaws as an assembly rather than requiring removal of same as shown in prior art devices.

While a clamp arrangement requiring threading of the fastener is described in the preferred embodiment of this invention, alternative devices such as a spring loaded detent means could be employed to secure the jaws to the frame for quick-release purposes.

DETAILED DESCRIPTION OF THE INVENTION

Figure 1:
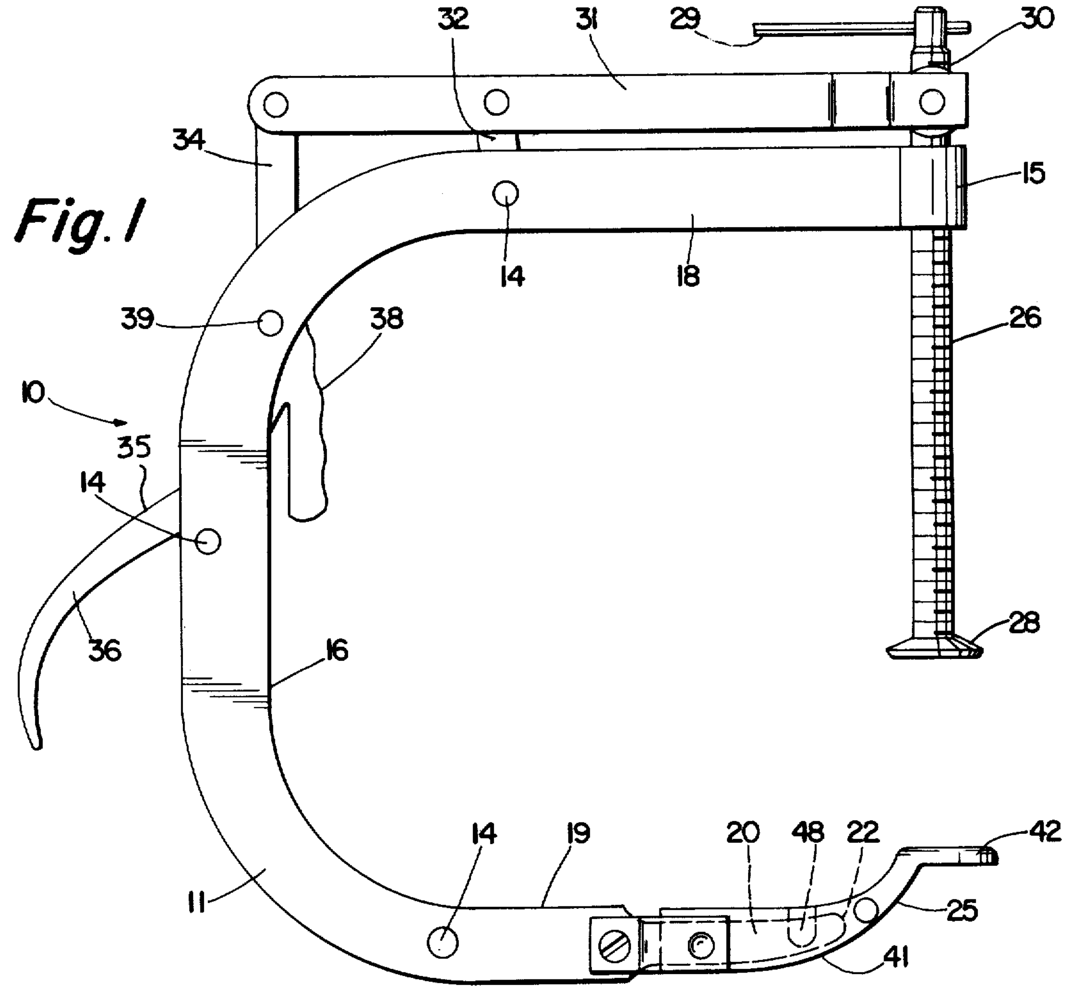
FIG. 1 is a side elevational view of the valve spring compressor tool of the invention with one form of quick-change spring seat bracket in position thereon.
Figure 2:
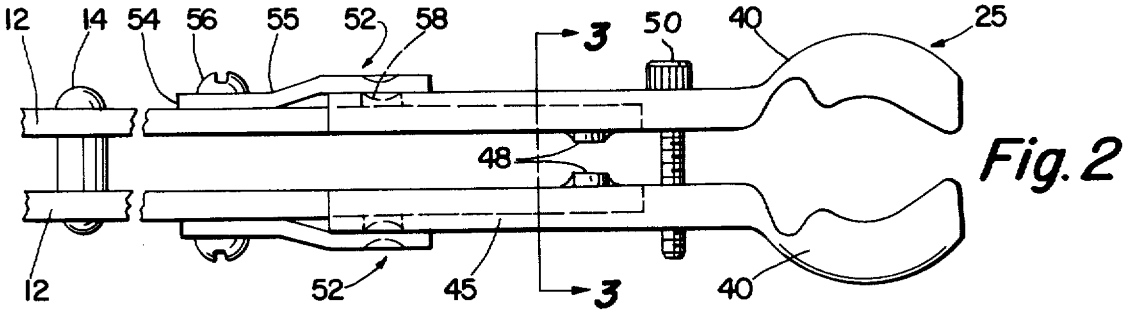
FIG. 2 is an enlarged view from underneath of a portion of the valve spring compressor tool shown in FIG. 1, showing primarily the spring seat bracket.
Figure 3:
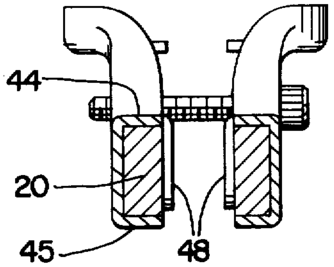
FIG. 3 is a cross-sectional view of a portion of the valve spring compressor tool with spring seat bracket, taken at the line 3—3 of FIG. 2.

Referring now to FIGS. 1-3, there is shown one embodiment of this invention wherein a valve spring compressor tool 10 consists of a c-shaped frame 11 formed of a pair of identically-shaped frame members 12 joined together by a plurality of rivets 14 and a screw guide sleeve 15, welded thereto. Each of the frame members 12 is formed of a flat rectangular cross-section bar and while of curved c-shaped configuration, generally comprises a vertical frame section 16 intermediate horizontally extending upper and lower legs 18, 19, respectively. Upper frame legs 18 terminate at their outer ends in screw guide sleeve 15, while lower frame legs 18 terminate in reduced width, gently tapering more narrowly and slightly upwardly curved end portions 20, shown in dashed lines in FIG. 1, and terminating at the blunt free ends 22. The thusly spaced end portions 20 of the frame 11 are adapted for receipt of a set of jaws 25 forming a spring seat bracket which are adapted for engagement with a valve spring or valve spring seat in a manner well understood in the art.

The compressor tool 10 is provided for the purpose of engagement with valve springs of automotive engines and the like and comprises a mechanism for developing a high level of force in order to overcome the relatively stiff springs of the modern engine as well as to achieve this end in a convenient manner, thereby allowing freedom for the mechanic to perform the necessary servicing operation. In a typical device, as well known in the art, such tool 10 may further comprise threaded presetting screw 26, terminating at its lower end in a rotatable valve clamp disc 28 and receiving at its upper end hand grip pin 29 for imparting rotation to the screw. Preset screw 26 is slidably received in guide sleeve 15 for axial adjustable movement toward and away from spring seat bracket 25, and is threadedly received in actuating nut 30. Nut 30 is pivotally mounted in actuator lever 31, the latter formed of a pair of lever frames which are riveted to form a unitary structure. A fulcrum link 32 is pivotally joined to lever 31 and frame 11, and a toggle link 34 is pivotally joined to lever 31 and handle member 35. The handle member 35 includes a gently curved hand grip portion 36 and an integral finger grip lever 38 and is pivotally joined to frame 11 by rivet 39.

The fulcrum link 32, toggle link 34, actuator lever 31 and handle member 35 form an over-center linkage arrangement which serves to move preset screw 26 from a vertically elevated position, through guide sleeve 15, to compress and secure a valve spring positioned between clamp disc 28 and the spring seat bracket 25, in a manner well understood in the art. A quick and one-handed release is provided by finger pressure against finger grip lever 38, allowing the mechanic a great degree of freedom in performance of this service operation. For a more detailed description of such form of valve compressor tool, reference is made to U.S. Pat. No. 3,668,765, of the inventor.

It is apparent then, that considerable reaction force is encountered in such type of service procedure and that the compressor tool 10 must be sturdy and reliable for the purpose. On the other hand, the tool 10 must be convenient in use and adaptable for various situations and the quick-change feature of the jaws 25 of the instant invention is particularly advantageous in this regard. In prior art devices, as noted in the above-identified patent, removable jaw structures were provided. However, in order to secure such jaws firmly it was common to employ several fasteners such as screws which had to be entirely removed from the frame to allow the jaw replacement. Such fastening arrangement is considerably improved and facilitated in the instant invention.

Thus, it is seen that the spring seat bracket 25 of this invention comprises a pair of jaws, each jaw 40, in a preferred embodiment of the invention, being formed from a length of sheet steel on the order of 3/32" thickness, by stamping, bending and the like. Each jaw 40 comprises an elongated leg portion 41 of tapering width, generally conforming to the width of the end portion 20 of the frame 11, narrowing and curving upwardly to generally match the curve of the end portion 20, culminating in a generally horizontally disposed spring seat portion 42. The leg portion 41 of each jaw 40 is channeled, that is, it includes upper and lower folded edges 44, 45, such that each leg portion 41, in cross-section, is u-shaped. The channel edges 44, 45 snugly engage the upper and lower edges of the end portion 20 of the frame 11, when placed in position thereon and thus prevent transverse movement of the jaw 40, that is, vertical movement as viewed in FIG. 1, relative to the frame 11.

In this preferred embodiment of the invention, each jaw 40, further includes a tab 48 thereon, comprising a further fold of the sheet metal forming the jaw. The tab 48 is of only limited width and is formed as a fold from the upper channel edge 44, extending toward the lower channel leg 45 to partially close the space formed between the channel legs 44, 45. With the jaw 40 in place upon the end portion 20 of the frame 11, tab 48 will be adjacent the end portion 20, near the free end 22 thereof, to prevent lateral movement of the jaw 40 relative to the frame 11.

Jaws 25 further include a width adjusting screw 50 passing through a hole in one jaw and threaded into a hole in the other to vary the spacing between the spring seat positions 42 to accommodate different size ranges. The adjustment screw 50 is located in the leg portion 41 of the jaw in a position such as to be beyond the free end 22 of the end portion 20 of frame 11, and as such does not require removal when changing the set of jaws 25 being employed.

A quick connect arrangement is provided for retaining the jaws in position on the frame 11. It will be clear that such connector need only prevent relative linear movement, that is horizontal movement as viewed in FIG. 1, between the jaws 25 and the frame 11. The quick-connect arrangement may take various forms, but in the preferred embodiment depicted, consists of a pair of clamps 52 which receive and secure the inner leg portions 41 of the jaws 40 to the frame 11. Each clamp 52 comprises a short length of steel strap 54, having a slight offset bend at 55 at the center, and releasably secured to the frame 11, by threaded screw fastener 56. Preferably, further, each strap 54 includes a small protuberance 58 on the inner surface thereof which is located so as to engage and enter a hole formed in the leg portion 41. The protuberance 58 is conveniently formed by dimpling the strap 52 and as such could provide a detent in cooperation with the hole in the leg portion 41 to retain jaw 40 in position. In this arrangement however, partial unthreading of screw 56 will release leg portion 41 to allow jaw 40 to be slid over and off the free end 22 of the frame 11.

Figure 4:
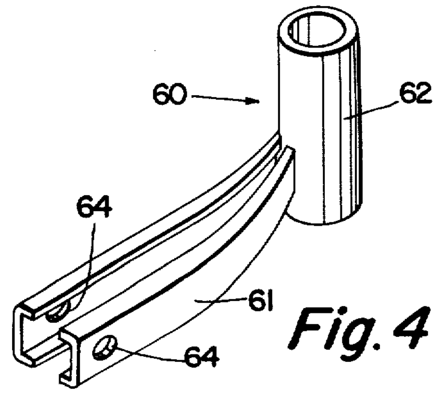
FIG. 4 is a perspective view of another form of quick-change spring seat bracket suitable for use with the spring compressor tool of FIG. 1.

In this embodiment of the invention, jaws 25 may be moved as a unit due to the coupling provided by adjusting screw 50. In another embodiment, as shown in FIG. 4, a non-adjustable valve seat engagement adapter member 60 is provided, consisting of channeled leg portions 61 which are substantially the same as the leg portions 41 previously described and which are adapted to fit over the free end portion 20 of frame 11. The leg portions 61, in this arrangement however, are welded to a vertically extending, tubular seat engagement member 62 and thus form a rigid structure, obviating the need for a device such as the tab 48, to prevent lateral movement of the seat 62 relative to frame 11. The adapter 60 includes holes 64 near the free end of the leg portions 61, which when placed in position on frame 11, receive the protuberances 58 of the quick-connect arrangement, to secure the adapter in position. It will be apparent that similar tools may be adapted to the quick-change feature of this invention, and that modifications may be made thereto, in other forms of tools, without departing from the spirit of this invention.

What is claimed is:

1. A valve spring compressor, comprising a frame of generally c-shape having a pair of spaced legs at the lower portion thereof adapted for receipt of a pair of valve spring engaging jaws, said valve spring engaging jaws being releasably secured to said frame, said jaws being generally of u-channel configuration having confronting channel legs adapted for a linear sliding fit over said frame legs at the free end of said frame, said channel legs preventing transverse movement of said jaws relative to said frame, means connecting said channel legs in side-by-side relationship independently of said frame for movement of said jaws as a unit relative to said frame, means spacing said channel legs to a dimension corresponding to the spacing of said frame legs to allow a sliding fit thereover, and quick connect means on said frame for receiving the inner ends of said jaws and for releasably securing said jaws against sliding movement, said quick connect means comprising threaded fasteners on said frame adapted to be tightened to secure said jaws and to be partly unthreaded to allow linear sliding movement and release of said jaws.

2. The valve spring compressor set forth in claim 1 wherein said spacing means is adjustable and is located beyond the free end of said frame legs.

3. The valve spring compressor set forth in claim 2 wherein said jaws further include tabs extending generally between the open ends of said channel legs for guiding said channel legs with respect to the free ends of said frame legs.

4. The valve spring compressor set forth in claim 3 further including detent means between said channel legs and said frame legs for locating said legs in a predetermined linear position with respect to each other.

* * * * *